United States Patent [19]
Rothermel

[11] Patent Number: 4,780,594
[45] Date of Patent: Oct. 25, 1988

[54] METHOD AND APPARATUS FOR IMPROVED CONTROL OF SUPPLY OF FILLER MATERIAL TO A WELDING LOCATION

[75] Inventor: Ronald R. Rothermel, Pollock Pines, Calif.

[73] Assignee: Dimetrics Inc., Diamond Springs, Calif.

[21] Appl. No.: 105,750

[22] Filed: Oct. 8, 1987

[51] Int. Cl.$^4$ ............................................. B23K 9/12
[52] U.S. Cl. .............................. 219/137.71; 219/136
[58] Field of Search ........... 219/137.71, 137.7, 125.12, 219/136

[56] References Cited

U.S. PATENT DOCUMENTS

| | | | |
|---|---|---|---|
| 2,093,881 | 9/1937 | Conrad | 219/137.2 |
| 2,340,093 | 1/1944 | White | 219/130.1 |
| 2,505,054 | 4/1950 | McElrath, Jr. et al. | 219/137.2 |
| 2,636,102 | 4/1953 | Lobosco | 219/137.71 |
| 2,723,331 | 11/1955 | Tyner | 219/137.2 |
| 2,731,536 | 1/1956 | Laur | 219/137.2 |
| 2,778,099 | 1/1957 | Anderson et al. | 219/137.2 |
| 2,806,127 | 9/1957 | Hackman et al. | 219/137.71 |
| 3,581,053 | 5/1971 | Manz | 219/137.2 |
| 3,584,185 | 6/1971 | Mann et al. | 219/130.5 |
| 3,627,977 | 12/1971 | Aldenhoff | 219/137.71 |
| 3,731,049 | 5/1973 | Kiyohara et al. | 219/137.71 |
| 3,737,614 | 6/1973 | Paulange | 219/125.1 |
| 3,934,110 | 1/1976 | Denis | 219/137.71 |
| 3,940,586 | 2/1976 | Sterns et al. | 219/136 |
| 3,956,610 | 5/1976 | Kanbe et al. | 219/137 PS |
| 4,019,016 | 4/1977 | Friedman et al. | 219/125.12 |
| 4,159,410 | 6/1979 | Cooper | 219/137.7 |
| 4,249,062 | 2/1981 | Hozumi et al. | 219/124.34 |
| 4,441,012 | 4/1984 | Risbeck et al. | 219/137.71 |

FOREIGN PATENT DOCUMENTS

| | | |
|---|---|---|
| 627795 | 1/1963 | Belgium. |
| 674680 | 6/1952 | United Kingdom. |
| 996126 | 6/1965 | United Kingdom. |
| 1133093 | 11/1965 | United Kingdom. |
| 1189182 | 4/1970 | United Kingdom. |
| 1245807 | 9/1971 | United Kingdom. |
| 1332059 | 10/1973 | United Kingdom. |
| 1601389 | 10/1981 | United Kingdom. |

OTHER PUBLICATIONS

Naidenov, "Mechanical Control of the Transfer of Electrode Metal", Avt. Svarka, No. 12, pp. 31–33., 1969.

*Primary Examiner*—Clifford C. Shaw
*Attorney, Agent, or Firm*—Pennie & Edmonds

[57] ABSTRACT

An improved filler wire feed controller for a welding system is described in which the filler wire can be supplied to the vicinity of an arc between an electrode and a workpiece in a four-portion cycle. The cycle can include a feed portion, during which the wire is supplied to the weld pool at a rate at which it is consumed and deposited on the workpiece; a retract portion, during which the wire is rapidly withdrawn from the workpiece; a pause portion, during which the wire is stationary with respect to the arc; and an advance portion, during which the wire is advanced rapidly into the arc. This four-portion cycle provides increased flexibility of control of supply of wire to the weld pool, which can be employed to avoid balling of the end of the wire. The wire feed supply may be synchronized to variations in the current of the arc and also to movement of the wire guide/electrode asembly with respect to the workpiece.

10 Claims, 5 Drawing Sheets

METHOD AND APPARATUS FOR IMPROVED CONTROL OF SUPPLY OF FILLER MATERIAL TO A WELDING LOCATION

FIELD OF THE INVENTION

This invention relates generally to methods and apparatus for welding filler material onto a workpiece. More particularly, this invention relates to an improved method for control of the automatic supply of a band of filler material to a weld location on a workpiece.

BACKGROUND OF THE INVENTION

It is generally known in the welding art to automatically supply a band of filler material, typically a wire of filler metal (or "filler wire"), to the vicinity of an electric arc created between a consumable or non-consumable electrode and a workpiece. In some cases the wire of filler material is the electrode; in others, a separate electrode is used. It is important that the various weld parameters, such as the current and voltage of the arc and the rate of supply of the filler material, be adjustable by the operator to ensure proper welding. Additionally, in many applications the workpiece is automatically moved relative to the electrode and the supply of filler material.

Welding systems have also been developed in which the rate at which the filler material is delivered to the vicinity of the arc is varied, to obtain various improvements in the welding process and in the versatility of use of the particular welding equipment. See, for example, U.S. Pat. No. 4,159,410 to Cooper. The Cooper patent shows several embodiments of devices for varying the rate at which the filler material is supplied to the vicinity of the arc.

In a first embodiment, the torch assembly (that is, the electrode and its supporting structure and a wire guide for guiding the filler wire into the vicinity of the arc) is moved in a reciprocating manner with respect to the workpiece. The welding machine also includes filler wire feed drive rolls which are cyclically rotated in forward and reverse directions, with the net forward rotation exceeding the reverse rotation, so that a net supply of wire to the vicinity of the arc occurs.

In another embodiment, the feed rolls rotate continuously while supplying the wire to a flexible wireguide conduit carrying the wire to the vicinity of the arc. The end of the conduit is reciprocated with respect to the electrode, such that the rate at which the wire is actually supplied to the arc varies. The Cooper patent also teaches synchronization of variation of the weld current with the motion of the filler wire with respect to the arc. See column 5, lines 54-63 of the Cooper patent.

U.S. Pat. No. 4,019,016 to Friedman et al. which is commonly assigned with the present application, discloses a welding control system in which the position of the torch assembly is moved in an oscillatory fashion back and forth with respect to the center line of a weld to be made. For example, if two pipes are to be butt-jointed, the torch is oscillated back and forth longitudinally across the joint, while the overall assembly moves circumferentially around the joint at a slower rate, such that the filler metal is deposited in a zig-zag pattern across the joint to be formed.

The Friedman et al patent teaches that the weld current may be varied in synchronization with the movement of the torch back and forth across the joint. In this way it can be ensured that the weld current (and hence the heat applied) corresponds to the cross-sectional area of the tubes to be joined, such that the appropriate amount of heat is supplied thereto. The Friedman et al patent also teaches automatic control of the wire feed rate in accordance with the position of the torch assembly with respect to the joint, and suggests feeding the filler wire at rates proportional to the current being supplied to the electrode. See column 5, lines 31-45; column 10, lines 22-59.

U.S. Pat. No. 4,441,012 to Risbeck et al teaches a further improvement in a device for automatically controlling the welding current and the rate of supply of filler metal to a welding arc. According to this patent, a particular advantage is obtained when the weld current and the wire feed rate are pulsed such that the weld current is at its maximum just as the tip of the filler wire touches the molten pool formed by the arc.

SUMMARY OF THE INVENTION

The present inventor has realized that a further improvement can be made in welding systems of this general type by providing additional flexibility in control of the filler wire feed rate and welding current. More specifically, the present inventor has realized that further improvements can be made by provision of a filler wire feed cycle comprising four portions. These portions comprise a feed portion at which the wire is fed into the arc at a rate at which it is consumed and deposited on the workpiece; a retract portion, during which the wire is withdrawn from the vicinity of the arc; a pause portion, during which the wire is neither advanced or retracted from the arc; and an advance portion, during which the wire is supplied at a rate faster than the feed rate, so as to cause the tip of the wire to rapidly approach the arc. By provision of this multiple portion wire feed cycle, substantial additional flexibility is provided to the operator in defining the parameters of a particular welding operation. Such additional flexibility is very useful, particularly in connection with delicate welding operations, such as the welding of additional filler material onto turbine blades.

The particular advantage provided by the invention is that when the wire is not being consumed at the normal feed rate, it is being rapidly advanced into or retracted from the producing region or is stationary. The benefit provided by this is that the wire spends relatively less time in the "melt" area of the arc for a given metal deposition rate than in a simple feed/retract cycle. When the feed portion of the cycle is over, the wire is retracted rapidly over a distance sufficient to prevent the formation of a "ball" on the end of the wire. Such balling can lead to improper welding, as discussed in certain of the patents listed above. According to the invention there is less time for the ball to form. Moreover, provision of the fast advance portion of the cycle allows more time for actual wire consumption, achieving further efficiencies.

BRIEF DESCRIPTION OF THE DRAWINGS

The invention will be better understood if reference is made to the following drawings, in which.

DESCRIPTION OF THE PREFERRED EMBODIMENTS

Figure 1:
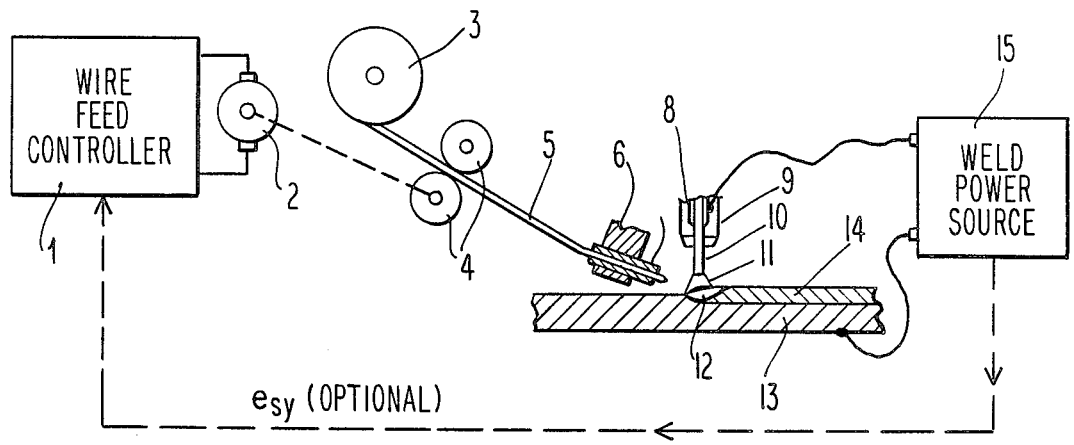
FIG. 1 shows a schematic view of a welding apparatus according to the invention during the pause portion of the welding cycle.

The elements of a typical arc welding system according to the present invention are shown in FIGS. 1 through 4. The example given is that of gas tungsten arc welding, that is, involving a tungsten electrode 10 which is not consumed by an arc 11 formed between the electrode 10 and a workpiece 13. The invention may also be employed in connection with other welding processes. In this example, a nozzle 9 directs a shielding gas around the vicinity of the arc 11 and the pool of molten metal 12, preventing the solidifying weld metal from exposure to the air while molten. Electric power is supplied to the arc 11 by means of a conventional welding power source 15 which is connected between a collet 8 carrying the electrode 10 and the workpiece 13. Preferably the weld power source 15 is adapted to provide pulsed weld power.

A band of filler material 5, typically a wire of filler metal, is passed from a wire supply spool 3 through wire drive rolls 4 to a wire guide 7. Wire guide 7 is normally carried by a guide support 6. The position of guide 7 with respect to the electrode 10 is operatoradjustable, allowing the operator to select the point at which the tip of the wire 5 enters the molten pool 12.

The wire drive rolls 4 frictionally engage the wire 5 and are driven by a wire drive motor 2 which is controlled by a wire feed controller 1. As indicated in FIG. 1, the weld power source 15 may provide a synchronization signal $e_{sy}$ to the wire feed controller 11, for example, if it is desired that the motion of the wire 5 be synchronized with pulses in the welding current supplied by the weld power source 15.

As mentioned, FIG. 1 shows the wire supply apparatus of the invention while in the pause portion of the weld cycle; accordingly, no arrows appear in FIG. 1, indicating that the wire drive rolls 4 are stationary.

Figure 2:
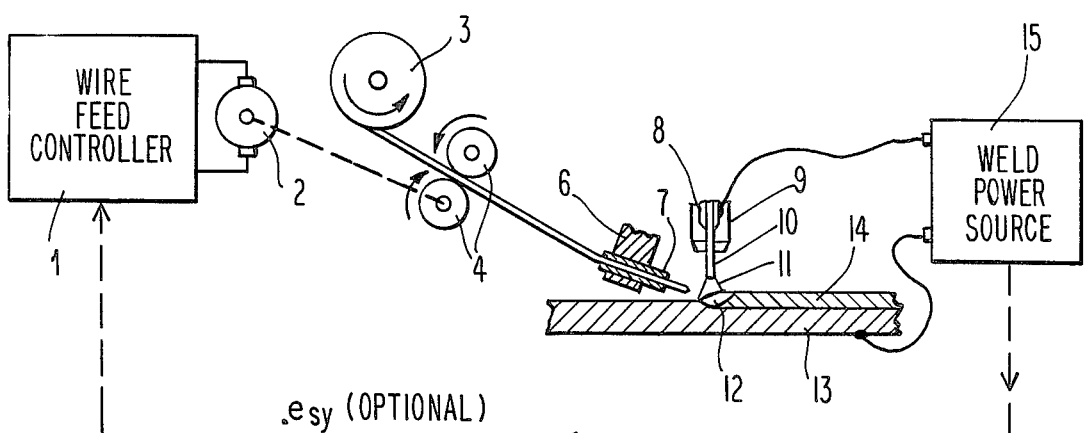
FIG. 2 shows the welding apparatus according to the invention during the advance portion of the cycle.

FIG. 2 shows a diagram corresponding to FIG. 1, except that the wire drive rolls 4 are shown rotating relatively rapidly, to advance the wire 5 into the vicinity of the arc 11 and the molten pool 12. The wire supply spool 3 is correspondingly rotated. FIG. 2 thus depicts the "advance" portion of the wire feed cycle, during which the wire is advanced rapidly into the vicinity of the arc 11.

Figure 3:
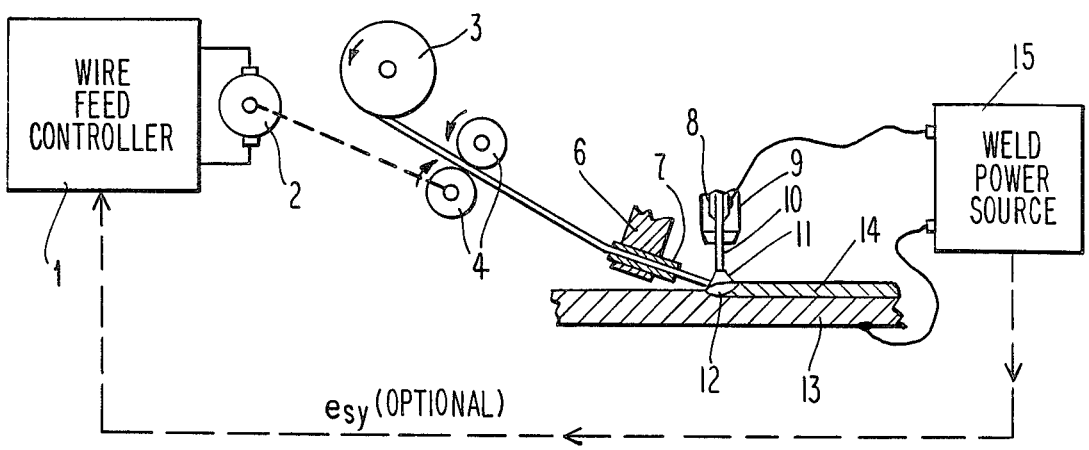
FIG. 3 shows the welding apparatus according to the invention during the feed portion of the cycle.

FIG. 3 shows the supply of wire 5 into the vicinity of the arc at a relatively lower "feed" rate. The feed rate is selected by the operator corresponding to the rate at which it is desired to deposit the filler material onto the workpiece. That is, the feed rate is the rate at which the filler material is actually melted by the arc and deposited on the workpiece.

Figure 4:
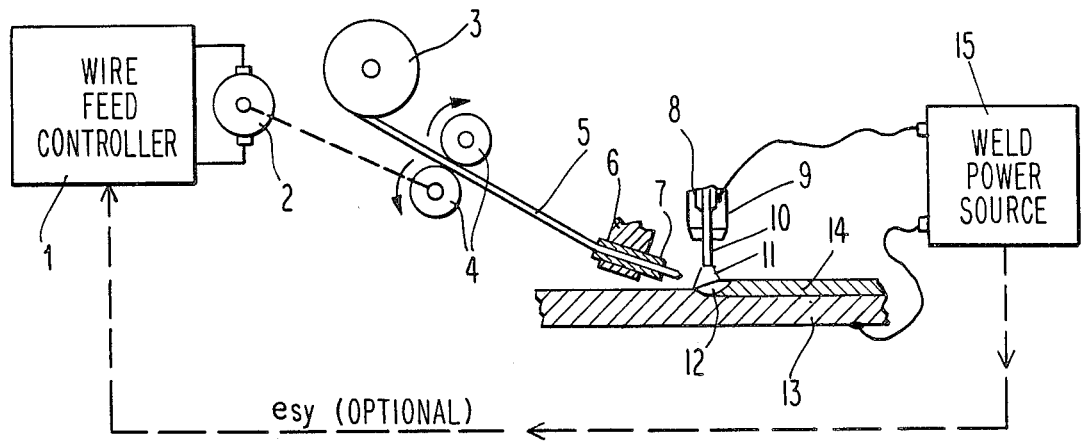
FIG. 4 shows the welding apparatus according to the invention during the retract portion of the cycle.

FIG. 4 shows the wire drive rolls being driven in the opposite direction from that of FIGS. 2 and 3, withdrawing the wire 5 from the vicinity of the arc 11. This is done to remove the wire rapidly from the arc at the end of the feed portion of the weld cycle so that its end does not tend to "ball", which as discussed in various of the patents discussed above can lead to difficulty in obtaining a sound weld. The amount of wire normally withdrawn in such a "retract" operation amounts to a fraction of an inch, so that it is not necessary to rewind the wire onto the supply spool 3.

Figure 5:
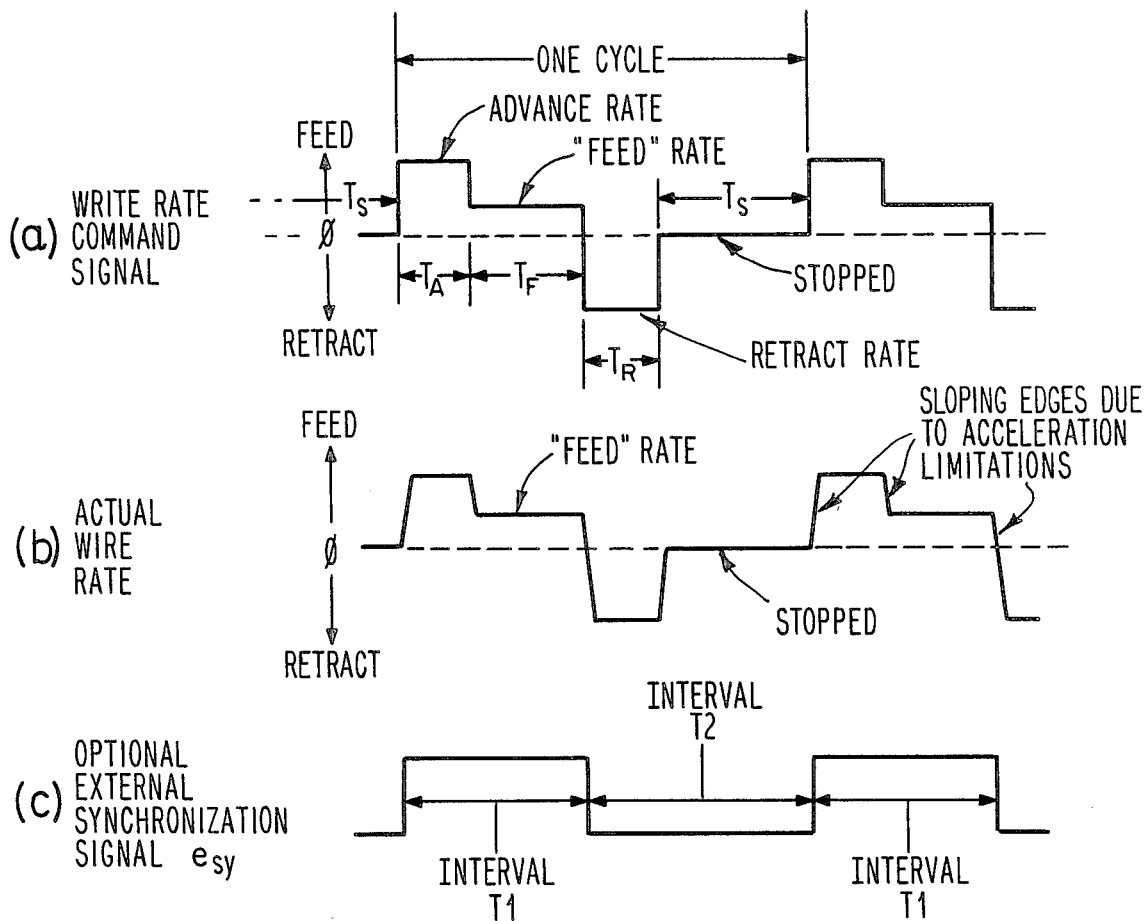
FIG. 5 shows a timing diagram of operation of the apparatus according to the invention, and comprises FIG. 5a, depicting a wire rate command signal as a function of time, FIG. 5b showing the actual wire feed rate as a function of time, and FIG. 5c showing an optional external synchronization signal as a function of time.

FIG. 5a shows a wire rate command signal which is given by the wire feed controller 1 as a function of time. The dotted line corresponds to a zero feed rate, that is, to the pause portion of the cycle as discussed in connection with FIG. 1. At the conclusion of the pause period $T_S$ of the weld cycle, the wire feed rate command signal is increased to a relatively high positive rate, referred to as the advance rate, which lasts for a period $T_A$. During $T_A$ the filler wire is advanced into the vicinity of the arc at a relatively high rate. At the end of $T_A$, the rate of supply of the wire to the pool is reduced to the feed rate; this lasts a period $T_F$, during which wire is fed into the pool at a rate at which it is consumed by the arc and deposited on the workpiece. At the end of period $T_F$, the retract period $T_R$ begins, during which the wire is withdrawn from the weld pool at a relatively high negative rate, comparable in magnitude to the advance rate. This is done to ensure that the tip of the wire does not form a ball. At the end of the retract period $T_R$, the pause period $T_S$ begins again, during which the wire 5 is stationary with respect to the weld pool.

FIG. 5b shows the actual wire feed rate as a function of time. This corresponds in shape to the wire rate command signal of FIG. 5a; the sloping lines between the various portions of the feed rate reflect the fact that the acceleration of the wire between the various portions of the cycle is not instantaneous.

Finally, FIG. 5c; shows an optional external synchronization signal $e_{sy}$ as a function of time. Signal $e_{sy}$ may be supplied from the weld power source 15 to the wire feed controller 1. Typically, signal $e_{sy}$ could be used to synchronize the filler wire supply cycle of FIGS. 5a–5b with variation in the amount of current being supplied to the arc 11. A wide variety of possible patterns of current variation with respect to the variation in the wire feed rate are possible according to the invention, and are deemed to be within the scope of the invention as defined in the appended claims.

Figure 6:
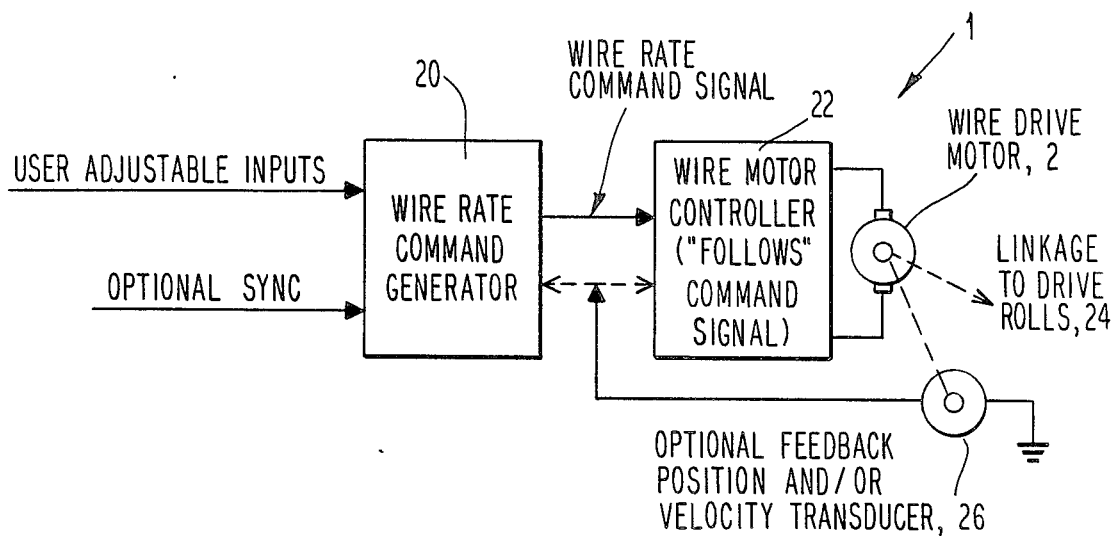
FIG. 6 shows a block diagram of typical elements of a wire feed control system according to the invention.

FIG. 6 shows a block diagram of a typical wire feed controller 1. A wire rate command generator 20 accepts user adjustable inputs relating to the various rates of feed, advance and retract of the wire, and of the durations $T_A$, $T_F$, $T_R$, and $T_S$ of the various portions of the weld cycle. As indicated, the wire rate command generator 20 can also accept the optional synchronization signal $e_{sy}$ from the weld power source 15, as just discussed. The wire rate command signal as shown in FIG. 5a is supplied by the wire rate command generator 20 to a wire drive motor controller 22, which provides the current supply needed to drive the wire drive motor 2 accordingly. The wire drive motor 2 then drives the drive rolls as indicated at 24 in any suitable manner. An optional position or velocity feedback transducer 26 may also be provided; this can be used to provide the wire rate command generator 20 or the wire drive motor controller 22 with actual information concerning the response of the motor 2 to the control signal, and to allow appropriate correction to be made.

Figure 7:
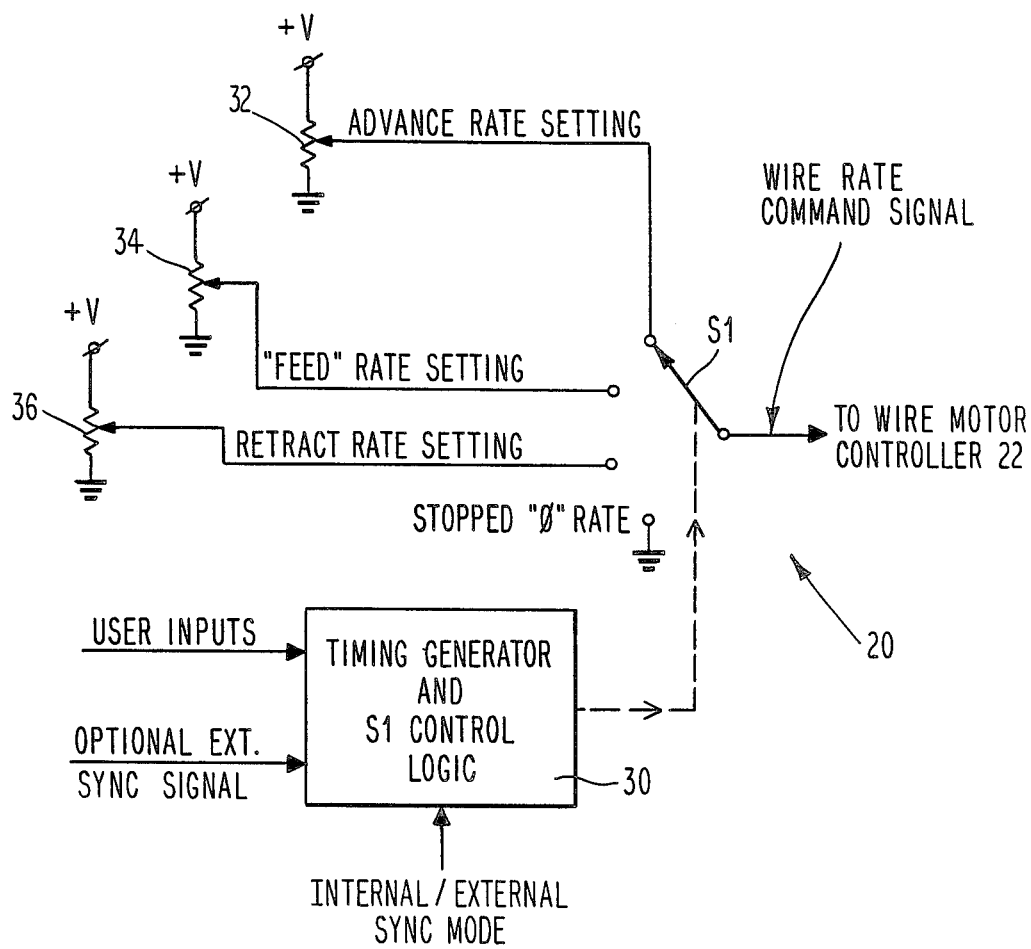
FIG. 7 shows a first embodiment of apparatus for generating wire feed rate control commands according to the invention.

FIG. 7 shows schematically one possible embodiment of the wire rate command generator 20. In this case a four-position switch $S_1$ is stepped by a timing generator and control logic unit 30 between four contacts corresponding to the four portions of the weld cycle shown in FIG. 5A. The switch $S_1$ may be connected in the first three positions to potentiometers 32, 34 and 36 for adjusting respectively the advance, feed and retract rate signals to be supplied to the wire motor controller 22. In the fourth position, switch $S_1$ can be grounded corresponding to the pause portion of the cycle. The timing generator unit 30 accepts user inputs defining the length of each portion of the cycle, as indicated, and the optional external synchronization signal $e_{sy}$, as described above. The timing generator control unit 30 may also accept an internal/external synchronization mode signal, should it be desired to synchronize the wire feed rate to something other than the pulses in the weld current provided by the power source 15. For example, such a signal could be derived from a motor oscillating the wire guide device and electrode assembly with respect to the workpiece, as described in the Friedman et al patent discussed above.

Figure 8:
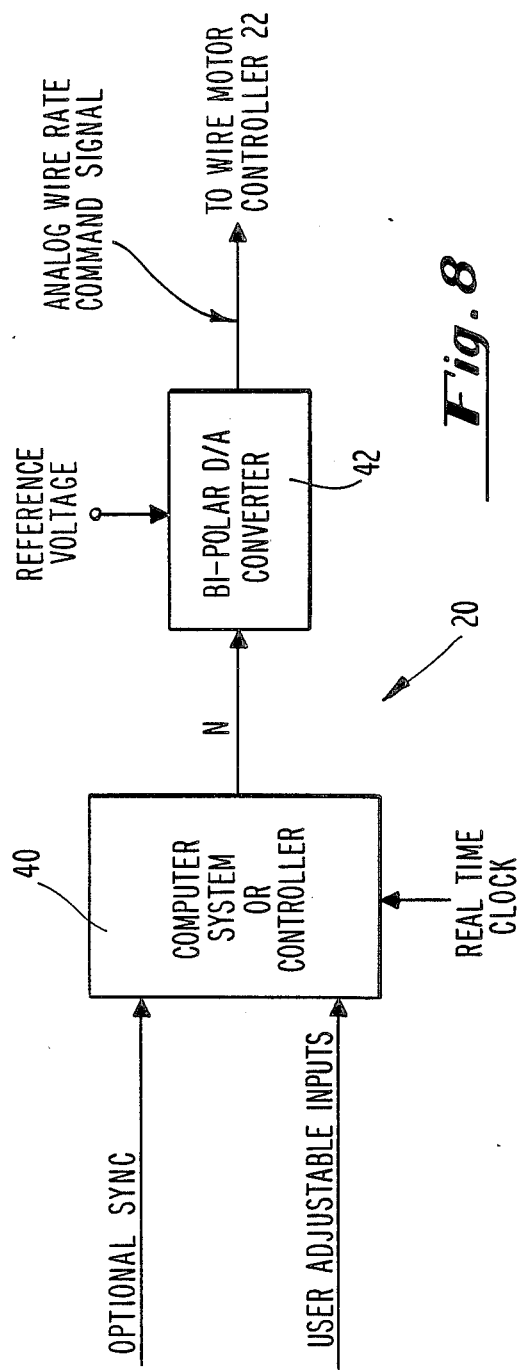
FIG. 8 shows a second embodiment of apparatus for generating wire feed rate control commands according to the invention.

FIG. 8 shows another possible embodiment of the wire rate command generator 20. In this case, a computer system or digital controller device 40 accepts the user adjustable inputs and the optional synchronization signal $e_{sy}$. It may also accept a real time clock signal as indicated. The computer 40 feeds a number N into a bipolar digital to analog converter 42. At any point, the number N is indicative of the desired feed rate. The bipolar digital to analog converter 42, employing a reference voltage input, provides an analog wire rate command signal corresponding to N to the wire motor controller 22, as indicated. Since the wire rate varies between positive and relatively negative values, corresponding to the forward and signals to be given to the wire motor, the digital to analog converter 42 is bipolar as indicated. The computer system 40 will typically be programmed by an operator to generate the proper sequence of numbers N for the corresponding durations $T_A$, $T_F$, $T_R$, and $T_S$ of the portions of the cycle. For example, computer 42 will output a first number NA indicative of the advance rate for time $T_A$; a lesser positive number NF indicating the feed rate for period $T_F$; a negative number $-N_R$ for period $T_R$; and a zero for the period $T_S$ corresponding to the pause portion of the weld cycle.

Figure 10:
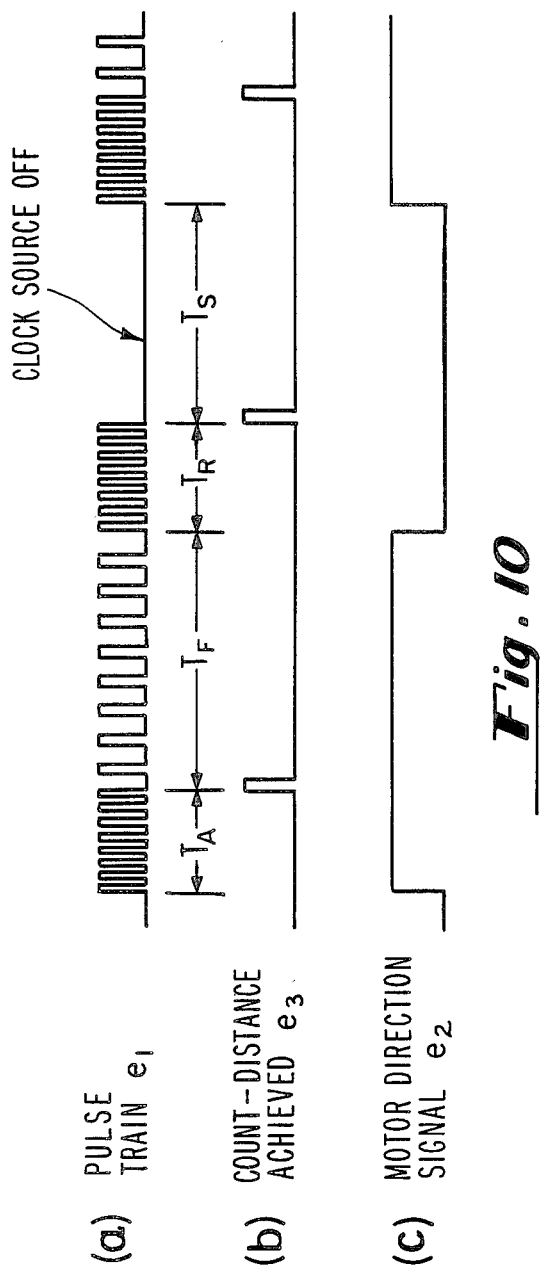
FIG. 10 shows certain timing signals useful in understanding the digital controller of FIG. 9.
Figure 9:
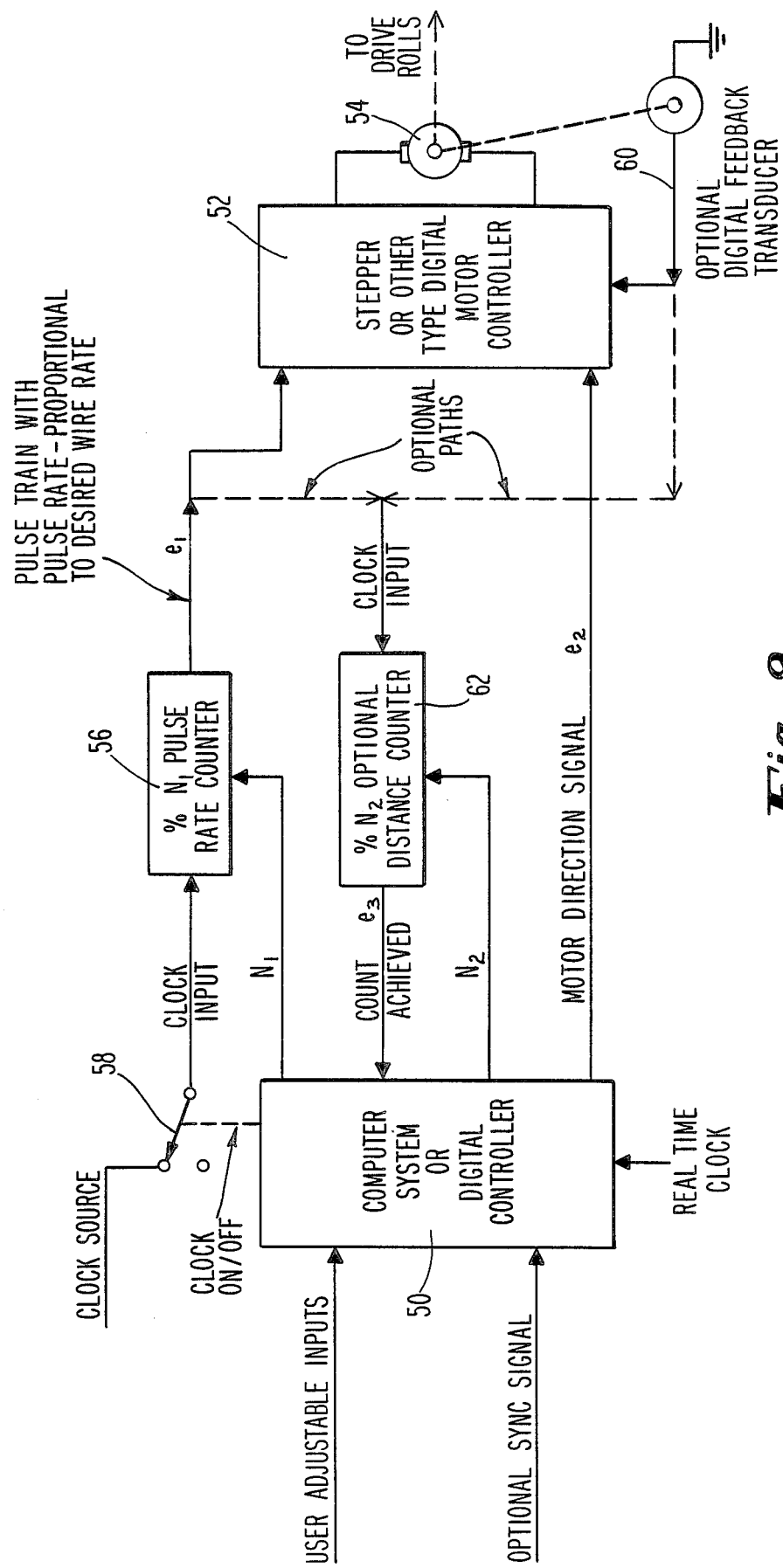
FIG. 9 shows a digital controller for controlling the rate of feed of wire to the arc in accordance with the invention.

FIG. 9 shows schematically an all-digital embodiment of the wire supply system according to the invention, and FIG. 10 shows certain signals as functions of time which will be useful in understanding the diagram of FIG. 9. In this case, a computer system or digital controller 50 is adapted to control a stepper motor controller 52, which then provides control signals to a stepper wire drive motor 54, which controls the drive rolls, as indicated. The stepper motor controller 52 responds to each of a series of pulses $e_1$ (FIG. 10a) by causing the stepper motor 54 to advance the wire some fixed distance. Hence the rate of the pulses controls the rate of motion of the wire.

The pulse train $e_1$ is supplied to the stepper motor controller 52 by a $N_1$ pulse rate counter 56. Counter 56 receives a count $N_1$ from the computer system, which indicates the rapidity at which the wire is to be advanced in each portion of the cycle. The counter 56 also receives a clock signal from a clock source via a switch 58, and uses this to generate an appropriate series of pulses $e_1$ to the stepper motor. The digital controller also outputs a drive direction signal $e_2$ shown in FIG. 10c as a function of time; this is provided to differentiate $T_A$ and $T_F$ from $T_R$, i.e. to determine whether the motor is to advance or retract the wire in response to a supplied pulse.

As shown in FIG. 10a, the rate of supply of pulses $e_1$ is proportional to the desired feed rate. Thus, a relatively fast series of pulses is sent during period $T_A$; a slower series during $T_F$; a similarly fast series during $T_R$; and no drive pulses are sent during $T_S$. Accordingly, the wire is driven quickly during $T_A$, less quickly during $T_F$, is retracted during $T_R$, and does not move during $T_S$.

An optional feedback transducer 60 may be employed to messure the distance the wire is advanced. Transducer 60 can be used to provide a distance signal to a further counter 62, which outputs a signal $e_3$ (FIG. 10b) indicating that the wire has been advanced or retracted in accordance with distance commands received from the computer 50. This allows the user to control supply of the filler wire by direct control of the wire feed and retract distances rather than by defining time intervals $T_A$, $T_F$ and $T_R$. During the period $T_S$ the computer 50 may control the switch 58 to disconnect the clock from the counter 56, thus preventing the wire from moving during period $T_S$.

It is considered that the above disclosure of the invention will be adequate to enable those skilled in the art to practice the same.

Although several preferred embodiments of the invention have been described, it will be recognized by those skilled in the art that this disclosure is merely exemplary of the invention and that numerous other modifications and improvements can be made thereto. Therefore, the invention is to be limited not by the above disclosure thereof, but only by the following claims.

I claim:

1. Apparatus for welding filler material onto a workpiece, comprising:
    means for supplying heat to a specific weld location on the workpiece;
    controllable feeder means for supplying a continuous band of said filler material to the vicinity of said weld location on the workpiece at a controllable rate;
    controller means for controlling the rate at which said band of filler material is supplied to the vicinity of said weld location on the workpiece, said controller means being adapted to accept commands to define a repetitive cycle of supply of said filler material;
    wherein said controller is adapted to define a repetitive cycle of supply including four portions as follows:
    a feed portion, during which said band of filler material is supplied to the vicinity of the weld location at a feed rate at which it is melted and deposited onto said workpiece;

a retract portion, during which said band of filler material is withdrawn from the vicinity of the weld location;

a pause portion, during which said band of filler material is essentially stationary with respect to the weld location; and an advance portion, during which said band of filler material is supplied to the vicinity of the weld location at a rate greater than said feed rate.

2. The apparatus of claim 1, further comprising means for variation of the amount of heat supplied to the weld location in synchronism with the control of the rate of supply of said band of filler material to the weld location.

3. The apparatus of claim 2 further comprising means for moving the means for supplying heat to a weld location on the workpiece with respect to the workpiece.

4. The apparatus of claim 3 wherein said means for moving moves said means for supplying heat in a generally oscillatory path about a desired welding pattern.

5. The apparatus of claim 4 further comprising means for varying the amount of heat supplied to the workpiece in synchronism with the oscillating motion of the means for supplying heat.

6. Method for applying filler material from a continuous band to a workpiece, comprising the steps of:

applying heat to a particular weld position on the workpiece; and controllably advancing the band of filler material into the vicinity of the weld position at which heat is supplied to the workpiece, in a repetitive cycle;

wherein said repetitive cycle includes the following portions:

a feed portion, during which the band of filler material is supplied at a feed rate at which it is melted and deposited on the workpiece;

a retract portion, during which the band of material filler material is withdrawn from the workpiece;

a pause portion, during which the band of filler is essentially stationary with respect to the workpiece; and an advance portion, during which the band of filler material is supplied at a rate greater than the feed rate.

7. The method of claim 6, further comprising the step of varying the rate at which heat is supplied to the workpiece in synchronism with said cycle.

8. The method of claim 7, further comprising the step of moving the position at which heat is supplied to the workpiece in accordance with a specified pattern in which filler material is to be deposited on the workpiece.

9. The method of claim 8, wherein the position at which the heat is supplied to the workpiece is oscillated about a desired welding pattern on the workpiece.

10. The method of claim 9, wherein the amount of heat supplied to the workpiece is varied in synchronism with the oscillating motion.

* * * * *